April 30, 1963 J. H. MORROW 3,087,255
APPARATUS FOR TREATING GASEOUS AND NONGASEOUS MATTER
Filed May 7, 1958 9 Sheets-Sheet 1

FIG. 1

INVENTOR.
JOSEPH H. MORROW

April 30, 1963 J. H. MORROW 3,087,255
APPARATUS FOR TREATING GASEOUS AND NONGASEOUS MATTER
Filed May 7, 1958 9 Sheets-Sheet 2

FIG. 2

INVENTOR.
JOSEPH H. MORROW

FIG. 3

INVENTOR.
JOSEPH H. MORROW

FIG. 5

INVENTOR.
JOSEPH H. MORROW

April 30, 1963 J. H. MORROW 3,087,255
APPARATUS FOR TREATING GASEOUS AND NONGASEOUS MATTER
Filed May 7, 1958 9 Sheets-Sheet 6

*INVENTOR.*
JOSEPH H. MORROW

April 30, 1963    J. H. MORROW    3,087,255
APPARATUS FOR TREATING GASEOUS AND NONGASEOUS MATTER
Filed May 7, 1958    9 Sheets-Sheet 7

FIG. 9

INVENTOR.
JOSEPH H. MORROW

FIG. 10

April 30, 1963 J. H. MORROW 3,087,255
APPARATUS FOR TREATING GASEOUS AND NONGASEOUS MATTER
Filed May 7, 1958 9 Sheets-Sheet 9

*INVENTOR.*
JOSEPH H. MORROW

United States Patent Office 3,087,255
Patented Apr. 30, 1963

3,087,255
APPARATUS FOR TREATING GASEOUS AND NONGASEOUS MATTER
Joseph H. Morrow, Hokendauqua, Pa., assignor to Fuller Company, Catasauqua, Pa., a corporation of Delaware
Filed May 7, 1958, Ser. No. 733,766
12 Claims. (Cl. 34—167)

The present invention relates to an apparatus for the treatment of gaseous and nongaseous matter in which a plurality of thin, relatively dense streams of nongaseous matter are passed through a moving body of gaseous matter in such manner that the moving body of gaseous matter is caused to take multiple paths in moving past and around the nongaseous matter. It is more particularly concerned with an apparatus for preheating or drying discrete particles of solid matter by utilizing discharge gases from a kiln, or the like and thereafter discharging such gases to the atmosphere in a substantially pollutant-free state.

The advantages to be derived from the preheating of cement raw materials by gases discharged from a cement kiln are well known. However, the installations heretofore employed in such processes have not been entirely satisfactory. There have been problems such as extreme height, size and mechanical complexity of the heat-transfer devices, the carry-over of dust and other pollutants to the atmosphere, and chemical and physical problems such as those involved in the use of high-alkali raw feeds, where condensation of liberated alkali vapors on the treated material causes a lower quality product. The solutions heretofore provided for these problems have added to the cost of installation and maintenance of preheating plants, or forced a compromise in designed efficiency of the plants in order to minimize the problems.

The present invention provides for the treatment of discrete materials, such as cement raw feed, or the like, in a plurality of thin mobile streams arranged within a low velocity, moving body of hot gases from which pollutants are to be removed, with a corresponding plurality of troughs supporting the material streams and arranged at slopes from the horizontal. The troughs provide for the downward passage of material along their surface and for the devious vertical passage of gas therearound. The devious paths which the troughs cause the gas to take cause separation of dusts from the gases and their delivery to the mobile streams of material. This arrangement also provides simultaneous, intimate association of the material with the moving, low-velocity gases, and causes such material to be heated efficiently without dispersion of the material in the gases or passage of the gases through the material.

The present invention further provides for the discharge of substantially pollutant-free gases to the atmosphere by providing a plurality of thin, flowing streams of water, or other liquid, flowing through a corresponding plurality of troughs arranged in the path of the gases and at slopes from the horizontal. The troughs provide for the downward passage of the water over their surface and for the devious passage of gases therearound. This arrangement cools the gases and subjects the pollutants therein to impingement against the water streams, and to directional changes and eddy currents about the troughs, which separate the pollutants from the gases and cause them to be deposited in the water streams for subsequent discharge with the water.

The utilization of a plurality of thin streams of discrete material requires the equal and controlled distribution of the supply of the material among the plurality of streams so that the treatment of material will be the same in each stream.

The present invention provides for the proportioned distribution of a supply of solid pulverulent or granular material among plural points of delivery by maintaining such material in a quiescent, fluidized state, and discharging the material through orifices designed in size, shape and location according to the proportion of the total flow which it is desired to pass therethrough.

In general, the preferred form of the apparatus as embodied in a cement preheating plant comprises a substantially vertical chamber which is divided into two subchambers by a vertical baffle or wall extending across the chamber from its floor to a point near the roof of the chamber, leaving an opening between the top of the baffle and roof of the chamber for the passage of gases therethrough. One of the subchambers has a gas inlet in its lower region to receive kiln-discharge gases therethrough. The second subchamber has a gas outlet in its lower region for exhausting of the kiln gases from the chamber by means of a suitable fan.

A plurality of troughs, generally U shaped in cross section, are arranged in the subchambers at slopes from the horizontal. The troughs are superimposed and serially opposed in the direction of their slope to form a plurality of continuous, downwardly extending courses which are themselves arranged so that adjacent troughs of similar elevation in two adjacent courses are sloped in opposite directions, thereby providing a crisscrossed formation.

The troughs are arranged so that they are surrounded by gases throughout the greater portion of their length, and communicate at their respective ends with junction or transfer members.

The courses arranged in the first subchamber receive substantially equal, individual streams of a nongaseous matter such as cement raw material on the uppermost troughs of a first group of troughs comprising approximately half of the total number of vertical series or courses. The streams are deposited thereon from a distributor employing a fluidized bed of material which discharges proportionately through orifices and conduits to the respective troughs. The equal distribution of the material among the courses is preserved in transit along the courses by individual communication of the transfer members between two successive troughs of each course. The lowermost troughs of this first group of courses discharge the material into a common receiver from which it is conveyed to a second fluidized distributor serving the second group of troughs comprising the remainder of the vertical courses. The lowermost troughs of the second group of courses discharge into a common receiver which delivers the material directly into the cement kiln. Control of the rate of feed to the kiln is provided by regulation of the supply to the distributors, or by a return conveyor which controls the level of material in the second distributor, and returns excess material to the first group of courses, or both.

The courses arranged in the second subchamber or section receive substantially equal streams of a nongaseous matter such as water on the uppermost trough of each course, and also at several lower stages of each course. The transfer members of the second subchamber are in the form of trays which serve a plurality of courses simultaneously and in common. The lowermost troughs of the several courses deliver the water to a common collecting pan from which it is delivered to a settling pond for clarification. A pump delivers clear water from the settling pond and also, at times, a make-up supply of fresh water to the troughs.

For a better understanding of the invention, reference is made to the accompanying drawings in which.

Figure 1:
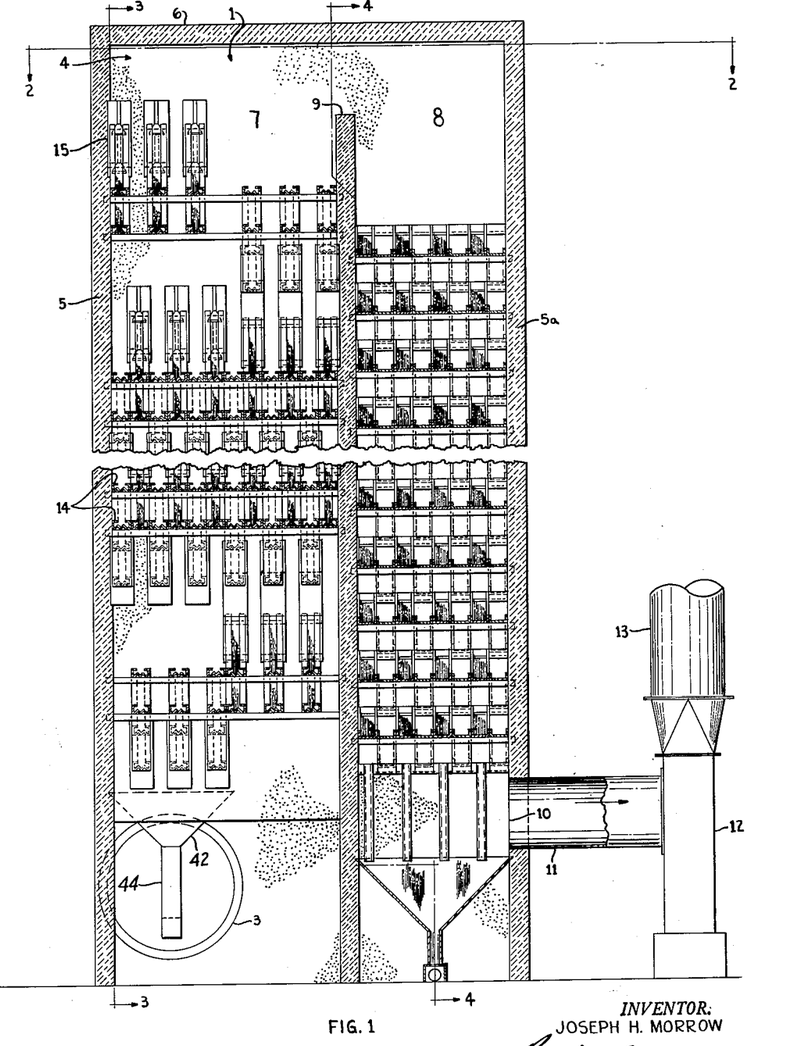
FIG. 1 is a sectional view of an apparatus embodying the invention.
Figure 2:
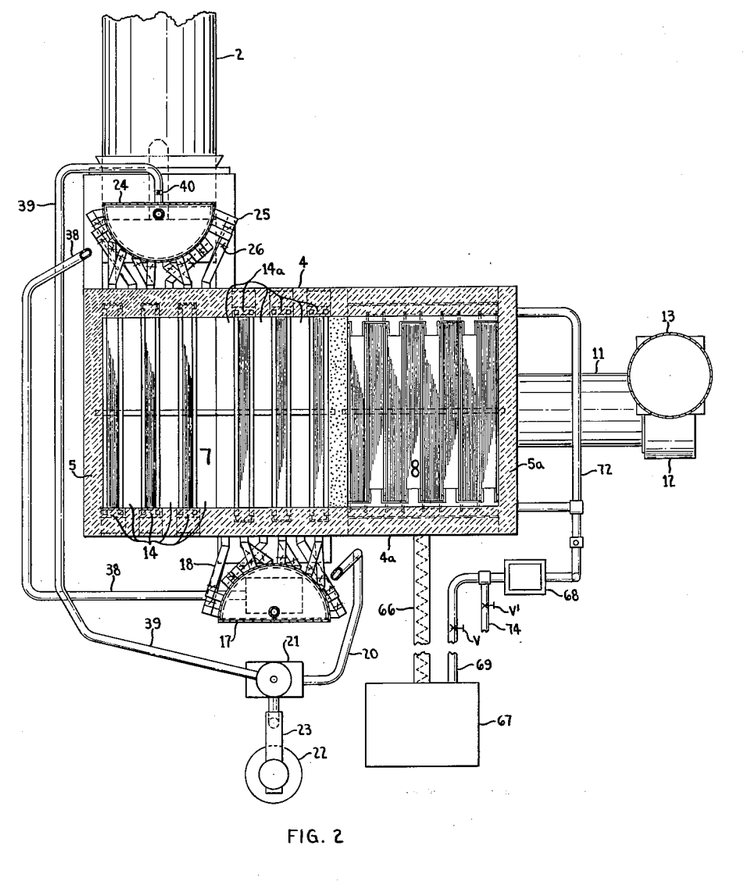
FIG. 2 is a sectional view taken along line 2—2 of FIG. 1.
Figure 3:
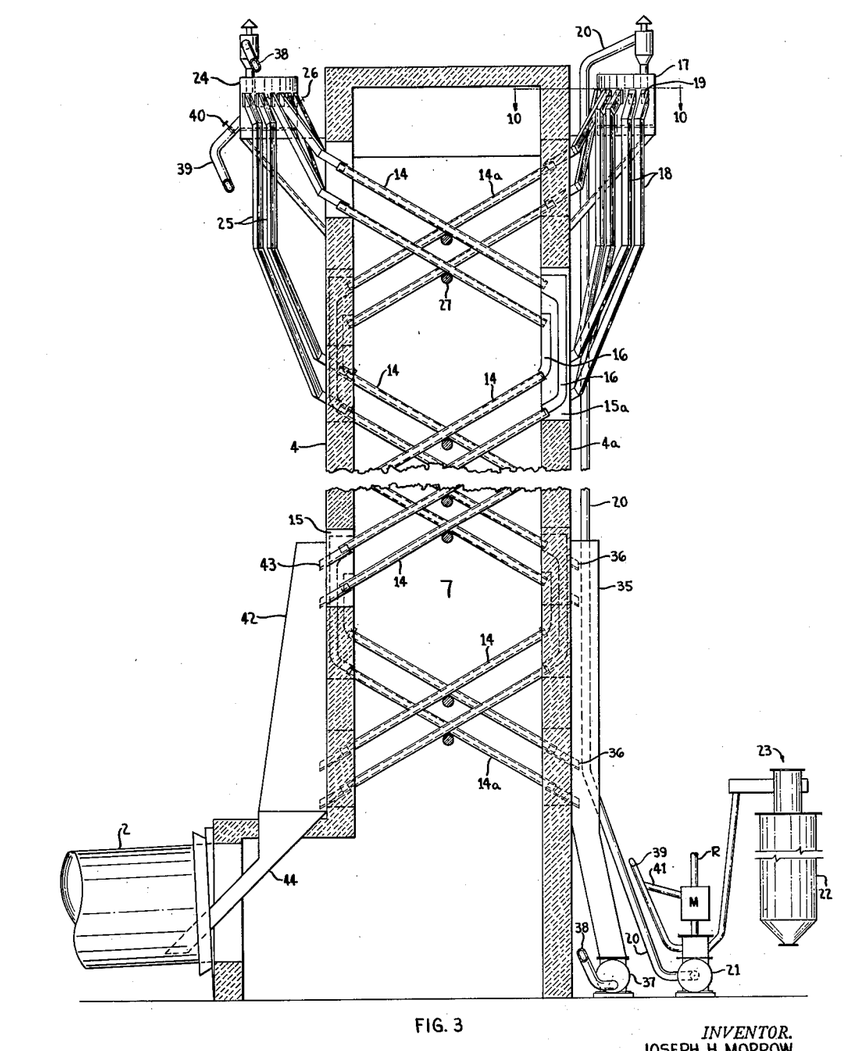
FIG. 3 is a sectional view of the apparatus taken along line 3—3 of FIG. 1 and showing the trough arrangement of the first subchamber.

As shown in FIGS. 1, 2 and 3, a chamber 1 communicates with a kiln 2 by means of a gas inlet 3. Chamber 1 is formed by walls 4, 4a and 5, 5a with a roof 6, and is divided into contiguous subchambers 7 and 8 by a baffle wall 9 which extends across between walls 4 and 4a, and terminates short of the roof 6 to allow the free passage of gas therebetween. The gas inlet 3 is in the lower region of subchamber 7 and a gas outlet 10 is in the lower region of subchamber 8 and communicates through a duct 11 and a fan 12 with an exhaust stack 13.

The subchamber 7 serves as a raw material preheating section and separates the major portion of pollutants such as dust particles which are present in the gases discharged from the kiln. Subchamber 8 serves to remove substantially the remainder of the dust and other pollutants from the gases which have passed through the subchamber 7.

Subchamber 7 is provided with a plurality of sloping chutes or troughs 14 and 14a arranged between a plurality of niches 15, 15a in walls 4 and 4a. Troughs 14 and 14a are similar in form but are arranged so that they form two distinct vertical series for material within the single gas path of subchamber 7. Troughs 14 form a material series through the portion of subchamber 7 which lies between the wall 5 and a centerline between wall 5 and baffle wall 9, while troughs 14a form a series between baffle wall 9 and the same centerline. The distinction between the two series of troughs 14 and 14a will become more apparent hereinafter as described in conjunction with the feeding of material and operation of the apparatus.

Throughout both series in subchamber 7, adjacent troughs of similar height in the subchamber are sloped in opposite directions to form an X arrangement of superimposed crisscross groups. The troughs of the respective crisscrossed groups are further arranged in vertically parallel and relatively closely spaced, paired X-groups which pairs are, in turn, superimposed and extended between niches 15 and 15a, and with transfer means 16 form paired, continuous downward courses for the raw material.

The troughs of the respective slopes of each series in subchamber 7 are spaced from one another by a distance substantially equal to the width of the troughs so that the sides of the troughs of the opposite slopes in each series will substantially abut where they cross adjacent the center of the subchamber, as viewed in FIG. 3.

A material distributor 17 is supported from the upper portion of wall 4a. This distributor serves, through a plurality of feed conduits 18 and valves 19, the upper ends of those troughs 14a of the upper two group pairs which slope downwardly therefrom towards wall 4. Material is supplied to the distributor 17 from the discharge end of a supply conduit 20 extending from a solids pump 21 which is fed by a supply hopper 22 and a metering apparatus 23 which is preferably of the type disclosed in my U.S. Patent No. 2,509,984.

A material distributor 24 is supported from the upper portion of wall 4. This distributor serves, through a plurality of feed conduits 25 and valves 26, the upper ends of those troughs 14 of the two upper group pair which slope downwardly therefrom towards wall 4a.

Figure 5:
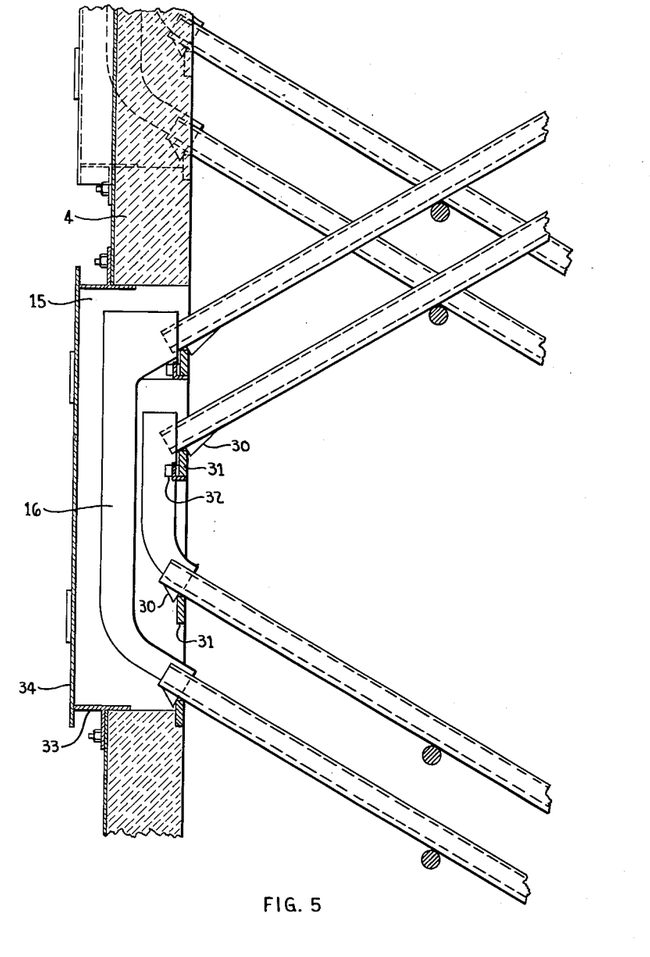
FIG. 5 is an enlarged sectional view showing the transfer members at the ends of the troughs.
Figure 6:
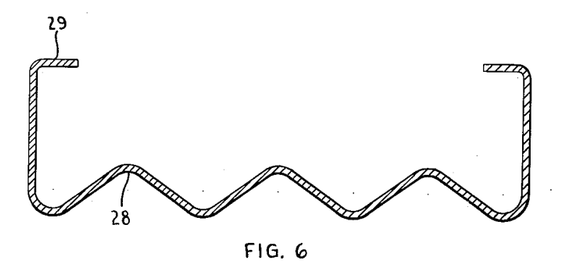
FIG. 6 is a cross sectional view of a preferred form of trough.

The troughs 14 and 14a are supported at approximately the midpoint of their length by a plurality of cross bars 27 which extend between wall 5 and baffle wall 9 at the underside or apex of each cross of troughs. Torsional and longitudinal stability of the troughs is provided by corrugations 28 and side wall flanges 29, as shown in FIG. 6. The flanges 29 also perform an important function in separating dust from the hot kiln gas, in a manner hereinafter described. As shown in FIG. 5, the positioning of troughs 14 and 14a is effected by means of one or more lugs 30 at the ends of each trough, which bear against suitable shoulders 31 arranged in niches 15, 15a of walls 4 and 4a. The transfer means 16 are also mounted on shoulders 31 by means of fasteners 32. The upper ends of transfer means 16 individually receive the lower terminal portion of a trough of one group, and the lower portions thereof terminate within the upper ends of the next lower group of troughs. The external portion of the niches 15, 15a are closed by frames 33 carrying hinged doors 34.

As shown in FIG. 3, a collecting hopper 35 is positioned along the outside of the lower region of wall 4a. This collecting hopper receives trough extensions 36 from the lower of the troughs 14a, and communicates at its lower end with the inlet of the solids pump 37. The outlet of solids pump 37 is connected by conduit 38 to the distributor 24. From distributor 24, an excess return conveyor 39 extends to solids pump 21 and is provided with a flow regulator 40 to control the amount of material in the distributor and, therefore, the rate of material delivery therefrom. As shown schematically in this figure, the return conveyor 39 may be provided with a diverting branch 41 entering a mixer M to permit the return and blending of wet-collected dust from a collector (not shown) by a return conduit R.

A collecting hopper 42 is positioned along the outside of the lower region of wall 4 and receives trough extensions 43 from the lower ends of the troughs 14. The collecting hopper terminates at its lower end in a kiln feed pipe 44, which enters kiln 2 in a conventional manner.

Figure 7:
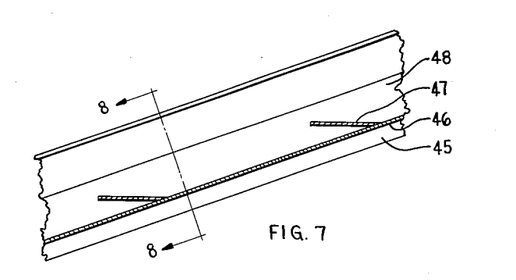
FIG. 7 is a longitudinal sectional view of a modified form of trough.
Figure 8:
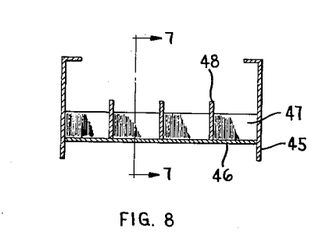
FIG. 8 is a sectional view taken along line 8—8 of FIG. 7.

As shown in FIGS. 7 and 8, a modified form of the troughs may be provided with side walls 45 which extend downwardly below the floor 46 of the troughs. Also shown in these figures is a form of material lifter 47, between a series of fins 48, which fins are similar in function to the corrugations 28 of the trough 14 of FIG. 6. The depending side walls 45 strengthen the trough and provide sharp edges across which the gases are caused to pass, establishing dust-separating eddies in the gases, and protect dust agglomerating on the underside of the trough until it reaches a size having sufficient mass to drop and fall through the gases to the lower troughs.

The material lifters 47 may be employed when indicated by a difficult solid material whose characteristics tend to make it slide en masse along the troughs even after agitation in the transfer means. In these cases, the lifters 47 interrupt and agitate the moving material as it passes thereover and falls back to the normal trough surface. The lifters are advantageously limited in height to substantially less than the depth of the fins 48, so that the fins may preserve the even lateral distribution of the material across the trough.

The distributors 17 and 24 deliver material at a proportioned rate to the several troughs they serve. The provision of an overflow return from distributor 24 to solids pump 21, or through the mixer M to the pump 21, provides a means for controlling the rate of feed delivered through the series of troughs 14 to the collecting hopper 42 and to the kiln through kiln feed pipe 44. The overflow return further permits the maintenance of an initial or recirculating body of partially heated solids for intermixing with fresh, unheated material to facilitate the heating of such cool solids or the drying and conditioning of wet dusts mixed therewith at the pump 21 or distributor 17.

Figure 10:
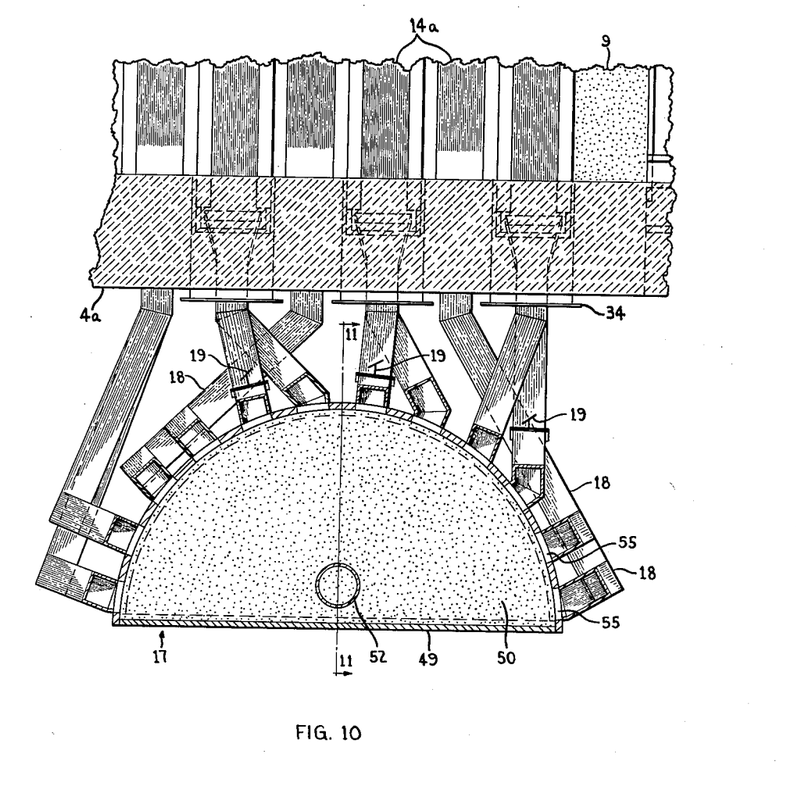
FIG. 10 is an enlarged sectional view of a distributor taken along line 10—10 of FIG. 3.
Figure 11:
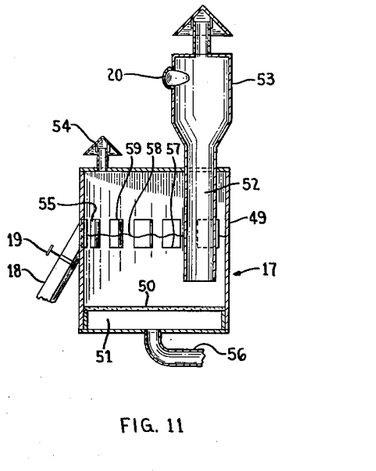
FIG. 11 is a sectional view, on a reduced scale, of the solids distributor taken along line 11—11 of FIG. 10.

As shown in FIGS. 10 and 11, the casing 49 of distributor 17 has a porous deck 50 above a plenum chamber 51. The casing 49 is provided with a material inlet 52, connected through a cyclone separator 53 to conduit 20 extending from the solids pump 21. This cyclone separates material from the stream of solids delivered by the pump 21 and delivers it by gravity to the material inlet 52. The casing also is provided with a vent 54, and a series of spill apertures 55, which serve individual feed conduits 18, having the individual valves 19.

A supply pipe 56 delivers fluidizing air or gas, from a source not shown, to plenum chamber 51. The air or gas delivered to the plenum chamber permeates the gas-permeable deck and fluidizes the material introduced into the casing 49 through the material inlet. As the material in the casing 49 is fluidized, it is expanded and its level rises until it is level with or above the spill edges 57 of apertures 55, whereupon excess material spills over the edges 57 and into the feed conduits 18 for delivery to the troughs 14a.

Air escaping from the fluidized bed of material at the level 58 leaves the casing 49 through the vent 54, which may be fitted with any suitable filter means.

The material inlet 52 extends beneath the upper material level 58 of the fluidized bed so that material entering therethrough is prevented from causing splashes or other sudden and uneven motion of the material level 58. However, if the character and flow of the incoming material is such that violent disturbance of the bed does not occur, the material inlet 52 may terminate above the material level 58.

The spill apertures 55 are shown at substantially equal distances from the material inlet 52 and are equal in area. In particular, the spill apertures 55 are equal in the lengths of their spill edges 57 since this is the limiting dimension for material flow in rectangular apertures when the material level 58 is below the upper edge 59 of the aperture, as may be normal in the operation of an installation of the present distributor.

Figure 12:
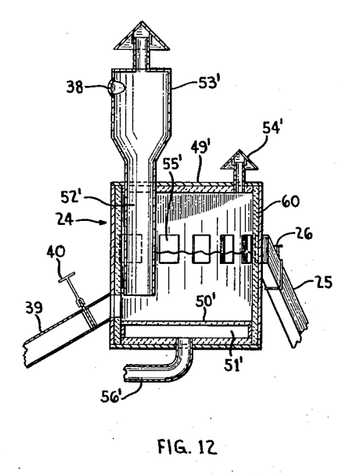
FIG. 12 is a sectional view of a second solids distributor showing the return conveyor.

As shown in FIG. 12, the components of distributor 24 which are similar to components of distributor 17 are identified by the same numerals, primed, as used in FIGS. 10 and 11.

The distributor 24 is comprised of a casing 49' having a porous deck 50' above a plenum chamber 51' and provided with a material inlet 52', a vent 54', a series of spill apertures 55', which serve feed conduits 25 having individual valves 26a therein, and an internal lining 60 of heat resisting refractory material. The material inlet 52' is connected to the supply conduit 38 through a conventional cyclone separator 53'.

An air or gas supply pipe 56' communicates with the plenum chamber 51' for supplying air or gas to fluidize the material overlying the deck 50' in a manner similar to that in which the material is fluidized in casing 49.

The excess return conveyor 39, having the flow regulator 40, preferably extends from the casing 49' at a point equidistant from the spill apertures 55' to maintain equal supplies of material at each aperture.

The operation of distributor 24 is similar to that of distributor 17, except that flow regulator 40 may be set to vary the depth of the material level 58', and thereby vary the rate of discharge through the spill apertures 55' to the troughs 14. As flow regulator 40 is opened to a greater extent, a greater rate of flow of material through the excess return conveyor 39 will occur, lowering the general material level 58' and the amount of material flowing from the casing 49' through conduits 38. Conversely, closing the flow regulator 40 to a greater extent will cause the material level 58' to rise and move material to be delivered through spill apertures 55' to conduits 38, provided the rate of material input through material inlet 52' is relatively constant.

The term "effective area" is used herein to describe that part of a spill aperture area of either distributor 17 or 24 which extends below the general plane of the upper surface of the fluidized bed of material in normal conditions of operation. If a rectangular aperture extends several inches vertically and two inches horizontally, and its lower edge or spill edge is normally one-half inch below the general plane of the upper surface of the fluidized bed, the "effective area" of the apperture would be one square inch. If the rate of supply of material to the distributor were increased or decreased and the general material level consequently raised or lowered respectively, the numerical value or representation of the effective area of an aperture would be correspondingly raised or lowered. If all apertures were identical in shape and dimensions, and in location with respect to the normal upper surface of the fluidized bed, the percent of change in effective area per unit change in depth of the material would be equal throughout all such apertures. However, if the apertures of a given distributor are not identical in these respects, the percentage change of individual effective area per unit change in depth may be calculated according to known methods of geometry.

The fluidized beds of both distributors 17 and 24 are maintained in a relatively quiet state of fluidization so that the upper material levels 58 and 58' are nonviolent in nature and material is now thrown or waved into spill apertures 55 and 55', but is smoothly displaced through them only by the expansion of material introduced to the respective beds through the material inlets 52 and 52'. The spill edges 57 and 57' are arranged in a plane substantially parallel to the plane of their respective upper material levels 58 and 58' in order that equal rates of flow may occur through each aperture of one distributor, although the apertures of one distributor may be delivering at a rate different than that of the other distributor.

In the operation of the apparatus as described so far and in conjunction with the production of cement, cement raw material from the supply hopper 22 is delivered by metering apparatus 23 to the solids pump 21 and subsequently through conduit 20 to distributor 17. In the distributor 17, the material is fluidized as previously described, and on passing through spill apertures 55, enters feed conduits 18 which deliver it to the upper ends of troughs 14a. Material flows along the troughs 14a from wall 4a towards wall 4 in a relatively dense or consolidated, though mobile, state under the influence of gravity to transfer means 16 from which it is delivered to succeeding troughs of opposite slope to be returned towards wall 4a, whereupon similar transfer means 16 in the niches 15a deliver it to succeeding troughs 14a which slope toward the wall 4. This flow of the material down the troughs 14a, back and forth across the chamber 7, continues until it reaches the lowest of the troughs 14a, whereupon it is delivered by the trough extensions 36 into the collecting hopper 35. From the collecting hopper 35, the material passes to the solids pump 37. Solids pump 37 delivers the partially preheated material through the conduit 38 to the distributor 24. In the distributor 24, the material again is fluidized and discharged through the spill apertures 55' to enter feed conduits 25 which deliver at least a portion of the material from the distributor 24 to the upper ends of the troughs 14, which are those more closely associated with kiln 2. Since the kiln is aligned with the space between wall 5 and the aforementioned centerline between wall 5 and baffle wall 9, the kiln delivers its gases immediately beneath those troughs. When a recirculating load of material is desired, and the supply to distributor 24 is in excess of that to be fed to the kiln, the remaining or excess portion of material in distributor 24 is returned by return conveyor 39 to the solids pump 21 and subsequently to the troughs 14a. Adjustment of flow regulator 40 effects a subtractive control of the material level in the distributor 24 and, therefore, of the rate of material flow to the troughs 14. This control acts as a control over the rate of kiln feed, since all material entering troughs 14 is delivered by trough extensions 43 into collecting hopper 42 and is fed directly into the kiln through kiln feed pipe 44.

The hot gases discharged into the subchamber 7 from the kiln 2 pass upwardly around and in contact with the troughs 14 and 14a and preheat the material flowing down them.

The heat transfer occuring in subchamber 7 will be primarily indirect in that the impingement of the hot gases on the surfaces of the trough will cause the trough to deliver heat to the material. There will be a degree of contact of gases with the material in the open top surface of the trough. However, where desired, and when the characteristics of the raw material make it possible, as in the case of a low-alkali raw feed for a hydraulic cement process, the amount of direct contact of gas with the flowing material may be increased by utilizing a horizontal flow of gases across the troughs, or a reverse flow of hot gases from that shown. In the latter case, the gases may be supplied at the upper end of subchamber 7 and exhausted from the lower regions of the chamber. This direction of gas flow will be particularly advantageous when this trough arrangement is applied to a material-cooling process, where dusting is not a great problem, such as the cooling of hot cement clinker, in which case it will afford a quick quenching of the incoming material by direct contact with the cooling gas.

The impingement of dusty streams against solid objects often tends to agglomerate the particles of those materials on the object. In accordance with the present invention, agglomeration, principally on the underside of the troughs, will generally continue until the weight of the agglomerated material is sufficient to overcome the adhesion to the trough surface or until some agitation or vibration of the structure shakes it loose. The agglomerated material will then fall directly down into the next lower trough to proceed through the system with the main body of material. Fine particles entrained in the gas which pass alongside of the trough and which are not agglomerated by impingement are subjected to a degree of centrifugal force as the gases oscillate and weave in between the troughs, and are also subjected to eddy currents as the gases pass across the edges of the troughs. These eddy currents are local movements of gas whose angular velocity may be greater than the velocity of the main stream of the gas. The centrifugal action due to this angular velocity and the force of gravity tend to throw the material out of the eddies and into the stream of material passing along the trough. The employment of inwardly directed reinforcing flanges at the upper edge of the trough side walls tends to enhance this effect by preserving the eddy currents and obstructing upward discharge of the dust from the currents.

In addition, since the main body of material is not introduced into the gas for entrainment therein and is substantially protected from direct impingement of the gas, as well as the fact that, in order to provide an optimum duration of the presence of the material in the gases, the gases are preferably of a relatively low order of velocity in terms of the velocities normally required for entrainment of solids, the material in the troughs will not be subject to entrainment. Consequently, further dusting of the gases is avoided, resulting in an overall cleaning or depollution of the gases passing through subchamber 7.

The employment of a liquid feed to the upper troughs to cause nodulization of the material thereon, as described hereinafter with reference to FIG. 9, will further reduce the passage of dust.

Provision of the two vertically spaced, parallel troughs between niches is advantageous in that it enables a greater amount of material to be exposed to the effects of the treating gases at a given time, and increases the frequency of oscillation or directional changes of the gases, the number of impingement surfaces available to the dust, and the number of eddy currents available to the gases for separation of dust therefrom. It is to be understood that while this multiple arrangement is particularly advantageous, it is not essential to the basic advantages of the invention.

Figure 9:
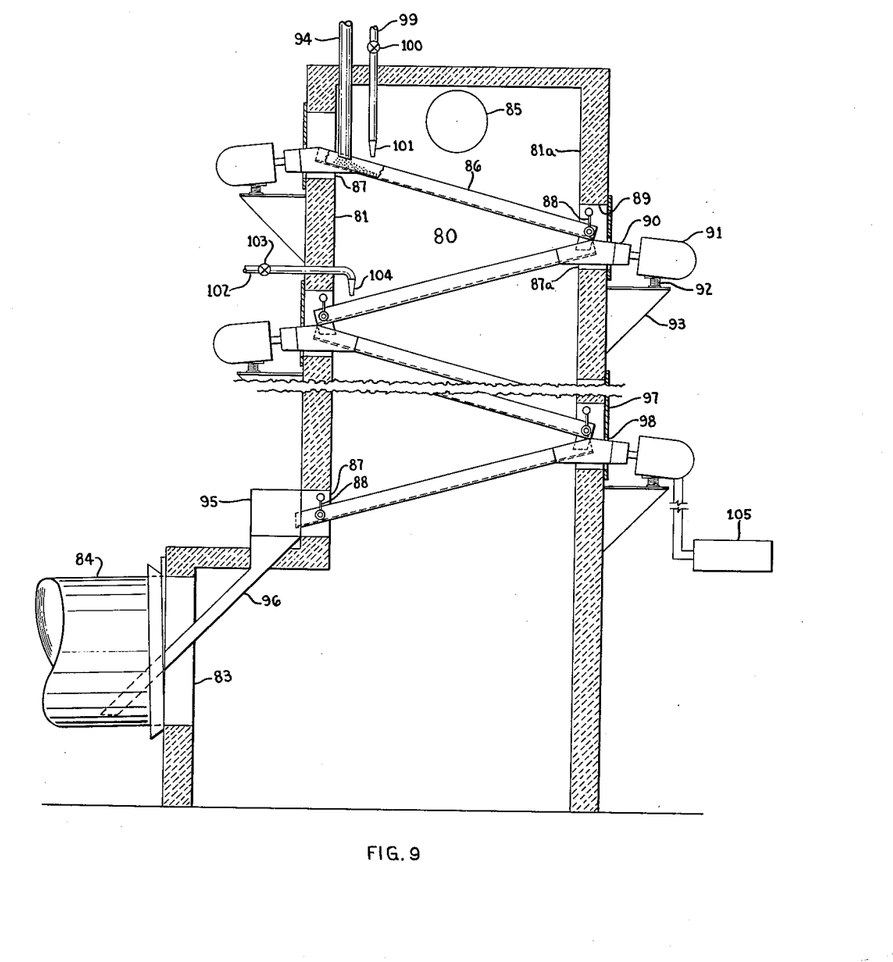
FIG. 9 is a sectional view showing a modified form of material-treating chamber.

The evenly distributed, mobile stream of relatively dense or consolidated material passing along the troughs 14 and 14a and the constant motion of the gas stream facilitate rapid heat transfer between the gases and the material on the troughs. The material passage shown enables material to receive heat not only from the air within the material streams, which is heated by the trough surface, but also by direct and repeated contact with the trough surface and the gases surrounding the trough. Since the material is both tumbling while in the troughs and agitated and inverted in transfer means at the ends of the troughs, the occurrence of extremely thin layers of hot material about a core of substantially cooler material is prevented. The material streams will have a substantially even temperature throughout a given cross sectional stream area, thereby insuring a complete and uniform preheating of the material as it progresses toward the final heating zone. In cases in which the material characteristics are such that it tends to slide en masse along the troughs, material agitators and lifters may be employed, as shown in FIG. 8.

Where a material is such that its flowability increases with its temperature, the plant may be designed so that the subsequent troughs in the series are arranged at a lesser slope from the horizontal than the initial or cooler material troughs. In this case, the troughs 14a between baffle wall 9 and the centerline might be at thirty (30°) degrees slope from the horizontal, while the troughs 14 between wall 5 and the centerline might be at a uniform fifteen (15°) degrees slope from the horizontal, or might vary in slope generally directly as their respective elevations vary from the ground level, or generally inversely as the temperatures at such elevations.

Where a material is such that its flowability may be a limitation to the capacity of the system, or may require high trough slopes and a consequent great overall height of the apparatus, a vibrational mounting of the troughs, such as shown in FIG. 9, is particularly advantageous.

In the event that a trough or troughs require replacement, such replacement may be effected very quickly through the hinged doors of the corresponding niche and, conceivably, with only a momentary shutdown of the feed to the uppermost trough in the course containing the trough to be replaced. Preferably, replacement or cleaning of a trough may be effected without a shutdown of the general process, and with only a temporary stoppage of the feed to the uppermost trough of the course to be worked on by closure of the proper valve 19 or 26.

Although much of the dust carried by the kiln gases will agglomerate or be collected on the troughs in subchamber 7 of FIG. 1, the gases reaching the top of the subchamber 7 may still carry a measurable amount of the entrained dust, as well as pollutants in other forms, for example, alkali vapors. These gases are then passed over the baffle wall 9 and downwardly through subchamber 8, where substantially all of the remaining pollutants are removed. The gases are drawn off the bottom of subchamber 8 through the gas outlet 10 and duct 11 by a fan 12, from which they are exhausted to the atmosphere through a stack 13.

Figure 4:
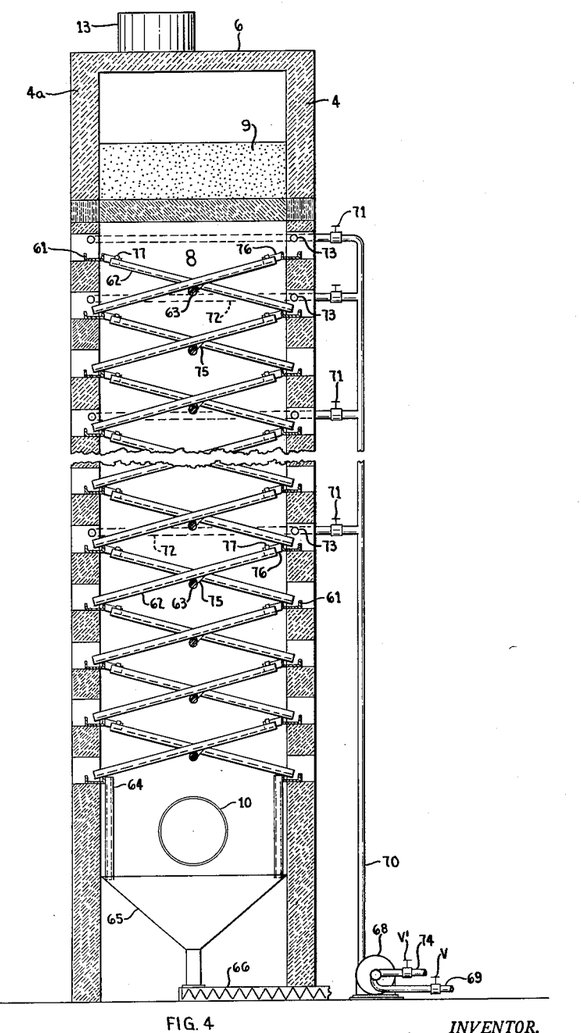
FIG. 4 is a sectional view of the apparatus taken along line 4—4 of FIG. 1 and showing the trough arrangement of the second subchamber.

In subchamber 8, and as shown in FIGS. 1, 2 and 4, a plurality of trays 61 are secured in horizontal pairs on walls 4 and 4a. These trays are supplied with water in a manner hereinafter described. A plurality of troughs 62 extend between walls 4 and 4a. The troughs slope downward from the trays on the respective walls to the next lower trap on the opposite wall, crisscrossing one another to form a series of stacked X-groups as shown in FIG. 4. A cross bar 63 is provided between baffle wall 9 and wall 5a at the underside or apex of each cross of troughs. The lowermost pair of trays 61 communicate with drains 64. A collecting pan 65 receives drains 64 and communicates through a conveyor 66 with a settling chamber or settling pond 67. A pump 68 receives clear water from a settling pond return pipe 69 and pumps it through a water supply pipe 70, valves 71 and headers 72 to a series of distributing pipes 73 arranged above trays 61 at several vertical heights. A water source 74 is connected to the pump intake, with a pair of valves V and V' regulating the proportion of fresh water and recycle water delivered to the pump through pipes 69 and 74, respectively.

Troughs 62 are supported at their approximate centers by lugs 75 which bear against the bars 63, and may be further secured at their upper ends to spouts 76 of their respective trays 61 by hooks 77.

Water supplied from water source 74 and/or settling pond return 69 is delivered by the pump 68 through the supply pipe 70, valves 71 and headers 72 to the distributing pipes 73. The water is dropped or sprayed from distributing pipes 73 into the trays 61 immediately therebelow. From the trays, individual spouts 76 communicate with the troughs 62 which carry the water along their slope to the next lower tray 61 on the opposite end wall, from which it is carried by subsequent spouts 76 and lower troughs 62, continuing until it reaches the drains 64. From the drains 64, the water is discharged to the collecting pan 65 and delivered by conveyor 66 to the settling chamber 67.

The gas passing downwardly through subchamber 8 follows a devious path in between and around the crossed groups of troughs 62. Dust which is entrained by the gas is removed by impingement against the water streams in the troughs 62. The gas, in passing downwardly through subchamber 8, is subjected to eddy currents and centrifugal forces similar to those occurring in subchamber 7. Furthermore, vaporization of the water in the hot upper portion of subchamber 8, resulting from heat absorbed from the hot gas, facilitates removal of extremely fine pollutants, such as fine dust and fume, by entrapment or solution in water droplets produced when such water vapor subsequently is condensed in the cooler, lower portion of subchamber 8. The cooling effect of the water also tends to condense other vapors which may be present, such as alkali vapors, thus further cleaning the gases.

The dust trapped in the water and delivered through drains 64 to collecting pan 65, conduit 66 and settling pond 67 may be separated from settling pond 67 in any of several known manners. The dust is then either returned to the process or discharged as waste. If such separated dust is sufficiently low in alkali content, or otherwise suitable, it may be particularly advantageous to reintroduce it to the kiln 2. In such case, the sludge is dewatered and introduced into the mixer M where it is mixed with the warmed material returned through excess return conveyor 39 and diverting branch 41, after which it is pumped by the solids pump 21 to distributor 17 from which it passes into the troughs 14a and eventually return to the kiln. The warmed, returned material with which the wet dust is mixed will dissipate a part of the excess moisture of the dust and thereby improve its condition for distribution by the distributor 17.

The nonsolid pollutants in solution or other close association with the water in the pond 67 may be removed therefrom in appropriate ways, such as chemical precipitation.

Since most of the water evaporated in the upper stages of the dust collector is intended to be recondensed and deposited on the lower troughs, the consumption of water will be relatively low, and will require a relatively small make-up supply in normal operation.

The devious route followed by the gases as they passed downwardly through the subchamber 8 produces a high frequency of directional change, while maintaining a low magnitude of directional change of the gas, similar to the gas motion occurring in subchamber 7. The greater flowability of water makes possible a lower degree of optimum slope of the troughs 42, and a greater number of vertically spaced troughs per unit height, consequently increasing the frequency of oscillation or directional change of the gases. These directional changes subject the dust within the gas to forces similar to those occurring in subchamber 7, which tend to deposit the dust on the water in the troughs. Furthermore, direct impingement of dust particles entrained in the gas on the surface of the sheets of water flowing along the troughs, and local eddy currents which are caused by the gases passing across the edges of the troughs, serve to eliminate dust from the gas stream.

The dust which is deposited in the water stream on the upper surface of each trough is swept therealong by the stream of water flowing along the trough. The provision of distributing pipes at various levels throughout the subchamber facilitates the prevention of a thick or high-viscosity slurry, and permits the maintenance of an advantageously consistent flow of water. Where the temperature of the inlet gas is sufficiently high, as is likely in the case of initial processes such as cement burning, evaporation of the water in the upper regions of the dust collector may require a high rate of water supply to the upper pans, in order to maintain a flow of water and to prevent baking of the deposited dusts on the trough surfaces. This has a further effect of quickly chilling the gases, reducing their volume and, as the gases are cooled by the water-laden troughs in the lower regions, the evaporated water may be recondensed, thereby entrapping and further depositing pollutants from the gases.

The supply of water at various levels, and the provision of valves 71 at each such level, makes possible an adjustment of the relative temperatures at various levels within the collector and, therefore, the employment of the most useful conditions for a given installation.

The crisscross trough arrangement shown, while enforcing a devious path for the gases flowing thereby, provides sufficient opportunity for the gases to move laterally with respect to the troughs, as to provide for a relatively low pressure-drop throughout the subchamber. The low magnitude of directional changes required of the gas, and the provision of multiple edges for producing eddy currents, as well as the constant streams of water in which the dust may be trapped, produce an efficient dust separation from the gases, reduce the volume of the gas, and thereby provide a relatively clean discharge to atmosphere through stack 13.

The arrangement of the troughs in the second subchamber 8 provides advantages similar to the dust collecting advantages described for the gas flow of the first subchamber 7, and further provides for the chilling of the gases by vaporization of the water passing along the troughs. In those cases in which the temperature of the gases tends to flash water off the initial troughs, a greater rate of supply of water may be delivered to the susceptible troughs, or those trays may be installed at greater angles from the horizontal, or both. This modification of slope or water supply is also advantageous in counteracting an increase in viscosity of the water due to the deposition of pollutants. Furthermore, the employment of individual transfer means similar to those of the first chamber 7 may be indicated if sludge tends to settle on the common transfer means or trays 61.

Vapors which may be present in the gas as a result of volatilization in the kiln or in the first subchamber 7 may be condensed in the second subchamber 8, according to their relative dew points and the degree of cooling obtained in the second subchamber.

The velocity of the gases when passing the troughs of the second subchamber 8 may be higher than when passing those in the first subchamber 7, since there is no opportunity for entrainment of discrete solids therefrom. Therefore, the cross sectional area of the second subchamber 8 may be designed to be smaller than that of subchamber 7, to produce a higher velocity and a resultant maximum centrifugal force and eddy current effect and, therefore, a maximum separation of pollutants.

The disclosed arrangement of troughs in both subchambers is particularly advantageous in that the troughs perform a dust separating function on the gases passing therearound. While the troughs arranged in this manner present a substantially full cross sectional impedance to a direct, or line of sight, flow of gases through both subchambers, thereby forcing the gases to follow a devious path through the subchambers, they do not impose a high resistance to the gas flow with a consequently high pressure drop across the chamber. The devious path followed by the gases does not require a great magnitude of directional change or of deviation from a straight line. In their passage, the gases may weave in and about the troughs, impinging on the trough bottoms and slipping along the sides thereof. The relatively free, though devious, gas passages through the material- and watercourses facilitate the operation of the kiln at gas and fuel rates which are most advantageous to the kiln itself, without adjustment of gas volumes, or dilution or other alteration of the gas, to maintain the temperatures and velocities of the gases in subchamber 7 within set limits. Furthermore, if for any reason, one or more of the troughs become obstructed, material or water damming up behind the obstruction is free to spill over the lateral edge of the trough, falling through the low velocity gas stream to the next lower troughs. If the spilled matter is material in subchamber 7 which is fine and light enough to become entrained, it is separated subsequently from the gas stream by the gas-solids separating effect of subsequent troughs in the remainder of subchamber 7, or in subchamber 8, or in both. Therefore, it is possible that a partially obstructed unit may be operated in such condition without serious consequences until a shutdown for repairs or cleanout is made more opportune by some other factors such as repairs or maintenance necessary for the kiln or another apparatus in the process.

The crisscrossed arrangement of troughs as shown in FIG. 1 is particularly advantageous in terms of dust collection and heat transfer as described. However, in particular cases in which the available heat transfer rates permit, and those in which dust is not a problem, such as may occur with some materials or with large-sized and dust-free granules of material, it is contemplated that the crisscrossing of troughs may be eliminated. An arrangement such as this is shown in FIG. 9 in conjunction with an alternate mounting of the troughs and an arrangement for nodulizing materials on the troughs of the invention, both of which are equally applicable to the crisscrossed arrangement of FIG. 1.

As shown in FIG. 9, a chamber 80 comprising a pair of walls 81 and 81a and a pair of end walls 82 has a gas inlet 83 in its lower region communicating with an external source of heated gas such as a kiln 84. The gases flow upwardly through the chamber and are exhausted therefrom through a gas outlet 85 in the upper region thereof.

Chamber 80 is provided with a plurality of sloping troughs 86 extending between walls 81 and 81a and terminating within corresponding niches 87 and 87a in the walls 81 and 81a respectively.

The lower end of each trough 86 is supported in a position in the upper region of its niche by a relatively free suspension member such as a hanger 88 secured to the upper wall 89 of the niche.

The upper end of each trough 86 is supported in a position beneath the lower end of its preceding trough by a connecting member 90 extended into the niche from an external vibrator 91. Each vibrator 91 is mounted by means of a relatively free suspension such as the spring mount 92 upon a support 93 extended from the adjacent wall 81 or 81a of the chamber.

The troughs are arranged in a plurality of vertical, zigzag courses in which each intermediate trough receives material at its uppermost end from the lower end of its preceding trough in the course. The top trough of each course receives a supply of material from an individual feed conduit 94. The feed conduits 94 may deliver material thereto in a regulated supply from a feeder (not shown) similar to the feeders described with reference to FIG. 1, or, as shown in the cutaway portion of the top trough, may be arranged as choke feeders which maintain a pile of material in a relatively small space between the lower end of the feed conduit 94 and the surface of the trough. In either case, means for closing each feed conduit 94 should be provided to isolate the trough courses for repairs. As shown in FIG. 9, the system depends on the vibrating motion of the trough to regulate the rate of feed.

The lowermost trough of each course delivers the material thereon into a collecting hopper 95 which terminates at its lower end in a kiln feed pipe 96 which enters the kiln 84 in a conventional manner.

Where, as in FIG. 9, a crisscross arrangement is not used, horizontally adjacent troughs of adjacent vertical courses are to be spaced from each other a distance one-third to two-thirds a trough width. This spacing permits the gas to flow between the troughs, surrounding and contacting the troughs throughout substantially their full length, and provides an eddy effect at the upper edges of the troughs to remove particles from the gas which may be entrained from the kiln.

The niches are externally closed by doors 97, each having an aperture 98 therein through which the associated connecting member 90 enters the niche. The apertures 98 are sufficiently large as to permit free motion of the connecting members under vibration. When favorable draft conditions are present, a slight amount of external air may be drawn through the apertures around the connecting members to cool the connecting members and protect the vibrators by reducing heat conduction thereto from the troughs 86. Alternatively, a flexible, heat-resistant boot (not shown) may be provided to seal the chamber at the niches. The doors may be split through their apertures to permit their removal without interference with the connecting member.

A plurality of pipes 99 having individual valves 100 therein enter the chamber and terminate in a nozzle 101 above each of the uppermost troughs, and are adapted to deliver a liquid in spray or droplet form over the surface of the material in the trough to cause an initial "balling" or nodulizing of the material.

A second series comprising a plurality of pipes 102, valves 103, and nozzles 104 are arranged to direct a liquid against the material which is initially nodulized by the liquid from the nozzles 101. The second series of nozzles 104 is shown, in FIG. 9, in association with the second highest trough. In practice, however, the location of the second series of nozzles 104 will be determined by variables such as the nodulizing rate characteristic of the material at the operating temperature, and the rates of supply of the material and of the liquid. This point may be, for example, at a lower point on the same trough from the nozzles 101, but will have to be determined experimentally.

Where initial nodulizing on the trough surfaces is found not desirable or feasible by reason of the material characteristics, or for any reason, alternatives, such as the introduction of thick slurry droplets through the nozzles 101 or a feed of previously nodulized material, are contemplated.

The several vibrators 91 are operated through suitable regulating means to control the rate of flow of material on their associated troughs. In the case of the electrically-driven vibrators shown, a control such as the rheostat 105 is provided to regulate the vibrational motion. Where pneumatic vibrators are employed, suitable valving is to be provided.

The vibrators 91 may be individually controlled or connected in groups to produce differential motion of the material on the troughs. In this way, the depth of the material on the troughs in any zone may be increased or decreased by increasing or decreasing the vibratory motion in the desired zone. As an example, it may be that a substantial material depth on the lower troughs is desired to protect those troughs from the heat of the gases discharged from the kiln 84. In this case, the vibrators driving the lower troughs are regulated to deliver a lesser vibrational motion than that of the upper troughs, thereby allowing the material to accumulate to a greater depth on the lower trough as it moves thereon toward the kiln.

In operation, the gases from the kiln 84 are passed upwardly through the chamber and discharged through the outlet 85 as described, and the vibrators 91 are set into operation. The material is delivered onto the uppermost troughs 86 adjacent the wall 81, and passes downwardly along the troughs, under the influence of gravity and the vibrational motion, toward the wall 81a. As the material reaches the lower end of the top trough, it is passed onto the upper end of the next lower trough and returned thereon toward the wall 81. Ultimately, the material is delivered by the lowest troughs into the collecting hopper 95, and discharged through the kiln feed pipe 96 into the kiln 84.

The gas flowing through the chamber surrounds each trough. The delivery of the gas around and past the troughs provides for a transfer of heat between the gas and the material, and establishes eddy currents at the upper edges of the troughs. The eddy currents are effective in removing dust particles from the gas, as described with reference to FIG. 1.

A nodule-promoting matter or liquid such as water, slurry, wet nodules, or a partially-dewatered slurry from a source such as the settling chamber 67 of FIG. 2 is introduced through the nozzles 101 in spray or droplet form onto the material passing along the top troughs. Upon contact with the material, the liquid droplets pick up material to form small nodules, which continue to grow by rolling against other material until insufficient free liquid remains to cause further material adhesion.

When the material is such that the nodules thus formed are relatively stable, the nodules may continue along the troughs to the kiln without further liquid treatment. However, in many cases, a further liquid supply is introduced through the nozzles 104 onto the previously formed nodules, permeating the exterior thereof and creating a more stable shell of higher moisture material about the relatively dry nodule center.

The volume of liquid to be supplied through the nozzles 101 and 104 is dependent upon several variables, and must be determined experimentally for each material. Also, the location of the secondary nozzles 104 along the vertical courses is to be determined experimentally, and is to be just beyond the point in the course at which the material is substantially nodulized, and comprises a minimum, or substantially reduced amount, of loose, fine particles. The presence of substantial amounts of fine particles in the material treated by the secondary nozzles 104 would cause further growth of the nodules, rather than a stabilization of their surface areas.

The formation of nodules on the troughs and the subsequent introduction thereof in a preheated condition to the kiln drastically reduces the amount of dust entrained from the kiln by the kiln exit gases. Therefore, a lesser dust content is present in the gas passing through the chamber, and the separatory action of the eddies at the trough further reduces the passage of dust to the atmosphere.

Figure 13:
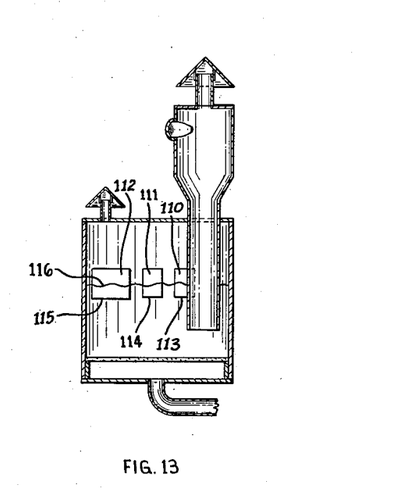
FIG. 13 is a sectional view of a modified form of distributor.
Figure 14:
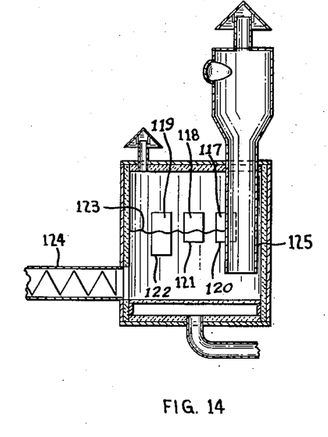
FIG. 14 is a sectional view of a further modified form of distributor.

The provision of the vibrators 91 permits the use of troughs of much lower slope than required for gravitational conveying alone, and inhibits the formation of any stagnant or encrusted portions of material on the troughs. Furthermore, when used in conjunction with nodulization on the troughs, the vibration assists in the formation of a plurality of separate nodules both by the motion imparted to the growing nodules and by precluding the formation of stagnant areas, which might otherwise form large masses under the effect of the liquid introduced.

Where the distributor of the present invention is utilized in a manner requiring other controls over several rates of flow, instead of the equal rates required for the troughs, the modified forms of distributor shown in FIGS. 13 and 14 may be employed.

In the modified form of distributor shown in FIG. 13, the spill apertures 110, 111 and 112 have their respective spill edges 113, 114 and 115 on a plane parallel to the upper material level 116, but the length of spill edge 115 is twice the length of spill edges 113 and 114 and will allow approximately twice as much material to spill thereover as will spill through each of apertures 113 and 114, to serve a use point requiring a double rate of feed.

In a further modification, as shown in FIG. 14, the spill apertures 117, 118 and 119 have their respective spill edges 120, 121 and 122 on different planes with respect to material level 123 so that there will be approximately twice the rate of flow through aperture 119 as there will be through apertures 117 or 118, since the effective area of aperture 119 is double those of apertures 117 and 118. However, if the material level 123, which may be controlled by known means, is raised, the aperture 119 will deliver progressively less than twice the rate of apertures 117 or 118, since the percentage rate of increase of effective area in apertures 119 is less per unit depth than in apertures 117 and 118, the length of aperture 119 being greater than the others only by one-third, or the distance of one aperture width. It follows that if the material level 123 falls below that shown, the delivery through aperture 119 will become progressively greater than twice that of apertures 117 or 118.

In cases in which a supply of material to one or more given points is critical, and the main material supply to the distributor may be erratic, the distributor shown in FIG. 14 may be of particular advantage. If spill aperture 119 serves a point such as a conveyor or other unit requiring the presence of material to maintain a gas seal and therefore requires a material supply in preference to, or irrespective of, the noncritical points served by spill apertures 117 and 118, the lower plane of spill edge 122 will continue to discharge at least some minimum of material after an erratic material supply has allowed the material level 123 to fall below the plane of spill edges 120 and 121. It is contemplated that a critical spill edge may be positioned at extreme depths with respect to the remaining spill edges, and the width of the corresponding aperture may be modified to produce the desired normal flow rate.

Therefore, if the spill aperture 119 were required to discharge material at a rate equal to the rate of discharge through each of spill apertures 117 and 118, and simultaneously insure a continuous, although diminished, supply of material to its associated point of delivery, it might be designed to have its spill edge 122 at the same lower relative level as shown in FIG. 14, but its width would be reduced to approximately half of the width shown. Also, known material level indicating means may be employed to actuate protective means should the supply to the distributor cease long enough to drain the material level to the level of spill edge 122.

The effect of such design modification of spill aperture 119 would be that of generally equalizing the normal effective area of the three spill apertures 117, 118 and 119. However, when a spill aperture such as aperture 119 receives material from a deeper portion of the bed, the discharge rate through that aperture may be affected by the slightly higher pressure of the bed at such lower depth. In this case, the rate of discharge per square inch of area through spill aperture 119 may be somewhat greater than the discharge rate per square inch of apertures 117 and 118. Therefore, for equal discharges through the three apertures, the effective area of spill aperture 119 should be slightly less than the effective areas of each of the other two. The extent to which the effective area of aperture 119 must deviate from equality with the others is a function of the physical characteristics of the material to be handled and the difference in depths between spill edge 122 and spill edges 120 and 121. This difference is best determined by experimentation, or is more easily obtained by the employment of adjustable weirs to determine the height of the spill edges or adjustable apertures.

It is further shown in FIG. 14 that the supply of material to the distributor may be accomplished by means of a screw conveyor 124, entering beneath the material level 123, as well as, or instead of, a material inlet 125.

If the apertures present equal effective areas through which material from the bed may spill, and the apertures are horizontally positioned relative to one another, the discharge rate through a given aperture will be equal to the concurrent discharge rate through each of the other apertures. Therefore, if equal and constant rate discharge is required, a constant rate of supply and equal effective areas of the apertures will be used. If an equal discharge to all points is required but a constant rate of flow is unnecessary, the effective area of the apertures will be retained equal, and the supply may be effected by ordinary suitable means.

The distributors of FIGS. 13 and 14 are also advantageous when different rates of flow are required at respective points of use, such as when feeding units of different capacities. In these cases, the ratio of the respective effective areas of the spill apertures may be proportioned to equal, substantially, the ratio of the requirements of the respective units being fed. The distributor of this form of the invention may be supplied at either a constant or a varying rate as required.

It is to be understood that spill apertures of various forms and relative dimensions are contemplated, and that adjustable spill apertures may be employed so that respective rates of flow may be adjusted, or that a given aperture may be closed entitrely for periods of time.

It is to be understood that the main chamber of the invention may be arranged vertically without a baffle wall, in which case the gases would flow directly from a gas inlet at the bottom of the chamber to a gas outlet at the top of the chamber without a change of general direction as occurs in the described arrangement. The arrangement disclosed in the drawings is advantageous for the preheating of cement raw material in that a straight line vertical arrangement would involve extreme structural height. However, in some situations, the rate of treatment will be sufficiently great to require lesser retention times for the nongaseous matter and, consequently, shorter vertical courses, thereby making feasible a straight line chamber having the water courses superimposed above the material courses, or vice versa, if the direction of gas flow is reversed.

The present invention reduces the overall height required for a preheating plant, in that its rectangular form may be increased in cross section without adversely affecting the velocities of the gas therethrough. The low gas velocities permissible with the present invention allow a long contact period between the gas and the troughs and the material to be heated. Although a desired increase in material capacity may indicate an increase in the number of superimposed crossed groups if the available ground area is limited, it is preferred that the number of troughs be increased by extending the cross sectional area of the chamber laterally with respect to the length of the troughs. In this way, the optimum length of the troughs, as well as the optimum slope thereof, may be retained, and even lower gas velocities are possible, while costly vertical extensions may be avoided. The terms "optimum length" and "optimum slope" are used here to describe values which are best determined experimentally. "Optimum slope" is a slope at least equal to, and preferably only slightly larger than, the minimum slope at which a given material will flow freely. The "optimum length" of a trough is a structurally convenient length, sufficient for advantageous duration of material travel thereon in the gas stream, and less than the length at which the acceleration of the material due to gravity accumulates a velocity which is so high as to be detrimental to the efficiency of heat transfer to the material.

In many installations, it will be preferable to employ a single tower of trough courses without recycling or two-stage passage of the material through the chamber. In this case, all the trough courses will receive material simultaneously from a single distributor, and will deliver the material collectively into the kiln.

In other instances and particularly when overall height is critical, it may be preferable to have a plurality of individual material-carrying trough sections arranged adjacent each other, with the gases alternating in direction of vertical flow between successive stages, or flowing generally horizontally and serially through the towers. In this case, the raw material may be delivered to a given tower, and, after passing through each tower, may be elevated and introduced to a tower nearer the kiln, ultimately being delivered into the kiln from the tower immediately adjacent thereto.

The illustrated and described embodiment of the invention is directed toward the treatment of solid materials in a dry state, but it is to be understood that a feed of wet material may be introduced on the uppermost material troughs for drying thereon and subsequent treatment as a dried material. In this case, it is contemplated that means may be necessary for preventing build-up of material baking on the troughs.

Various changes may be made in the details of construction of the disclosed invention without departing from the scope or sacrificing any of the advantages thereof.

I claim:

1. Coprocessing apparatus for gaseous and nongaseous matter comprising gas-confining means having at least an initial gas inlet and a final gas outlet and adapted to pass a stream of gas therethrough, a plurality of troughs arranged in said confining means and sloped from the horizontal, a plurality of junction means associated with the ends of said troughs and with said troughs arranged to form a plurality of individually continuous downward courses, each successive trough in each of said courses being arranged in a direction of slope generally opposite that of its preceding trough, said plurality of courses being arranged as a first section and a second section, each section comprising at least one of said courses, said second section being arranged in said gas stream downstream of the first section, said first and second sections each forming a devious path for said gas stream to pass serially through said sections and around said troughs, means for feeding a first nongaseous matter to the uppermost trough of each course of the first section, means for receiving and discharging said first nongaseous matter from the first section, means for feeding a second nongaseous matter to the uppermost trough of each course of the second section, and means for receiving and discharging said second nongaseous matter from the second section, whereby heat is exchanged between said gas and said first and second nongaseous matters, and at least a portion of the pollutants present in said gas stream are removed therefrom for discharge with said first and second nongaseous matters.

2. Apparatus according to claim 1 in which at least one of said sections comprises a plurality of courses, at least two of said courses of said section are arranged laterally adjacent each other, and the horizontally adjacent individual troughs of the respective adjacent courses are alternate in the direction of their slope to form a criss-crossed arrangement.

3. Apparatus according to claim 1 in which the first section comprises a plurality of courses, at least one first course thereof being arranged to receive discrete solid material from said means for feeding a first nongaseous matter, a second solids feeding means for delivering solids to at least one remaining second course of said first section, means for conveying solids discharged from the first course to the second solids feeding means, and said second course arranged to deliver solids entered thereon to said receiving and discharging means.

4. Apparatus according to claim 3 including means for returning a controlled portion of material from the second solids feeding means to said first feeding means for nongaseous matter.

5. Apparatus according to claim 1 in which said first and second nongaseous matters comprise a discrete solid and a liquid, respectively, and including means for separating solid pollutant material from the liquid discharged from the second section, and means for delivering said separated solid pollutants to at least one trough carrying discrete solids.

6. Apparatus according to claim 5 in which said first section comprises a plurality of courses, said feeding means for nongaseous matter is arranged as a solids feeder for feeding discrete solids to the first course, a second solid feeder is arranged to deliver discrete solids to at least one remaining second course, said second course discharges to said receiving and discharging means, means are provided for conveying material discharged by the first course to the second solids feeder, means for separating pollutants from the nongaseous matter discharged from said second section, and means for delivering said separated pollutants to said second course of the first section.

7. A heat exchanger comprising a chamber having a gas inlet and a gas outlet and adapted to pass a stream of gas therethrough, a plurality of troughs arranged in said chamber and sloped from the horizontal, a plurality of junction means associated with the ends of said troughs to form at least one continuous downward course therewith, each successive trough in said course being arranged in a direction of slope generally opposite that of its preceding trough, means for feeding a material to the uppermost trough of said course, separate means for introducing nodule-promoting matter to the material on an upper trough of a course, and separate means for introducing a liquid to the material in nodular form subsequent to the introduction of said nodule-promoting matter, and means for receiving and discharging said material from the lowermost trough of said course.

8. Heat exchange apparatus according to claim 7 comprising at least two of said courses, at least one of said courses being arranged to receive material from said material feeding means and to deliver material to said material receiving and discharging means, a second material feeding means for feeding material to the uppermost trough of at least one remaining course, a second material receiving and discharging means for receiving and discharging material from said remaining course, and means for conveying material from the first of said material receiving and discharging means to said second material feeding means.

9. Heat exchange apparatus according to claim 8 including a means for returning a controlled portion of material from said second material feeding means to said first material feeding means, whereby the rate of material flow over said remaining course may be controlled.

10. Gas cleaning apparatus comprising a chamber having a gas inlet and a gas outlet and adapted to pass a stream of gas therethrough, a plurality of courses of troughs arranged in said chamber and sloped from the horizontal, junction means associated with the ends of adjacent troughs of each course to form the troughs of each course into a continuous downward course, each successive trough in said course being arranged in a direction of slope generally opposite that of its preceding trough, at least two of said courses being arranged laterally adjacent to each other, and adjacent individual troughs of said two courses alternating in the direction of their slopes to form a criss-cross arrangement, means for feeding a liquid to the uppermost trough of said course, and means for receiving and discharging said liquid from the lowermost trough of said course.

11. Gas cleaning apparatus according to claim 10 including separate means for supplying liquid to intermediate troughs of the course, and means for controlling the relative rates of supply of liquid to said troughs, whereby the temperature of the gases may be modified.

12. A heat exchanger comprising a chamber having a gas inlet and a gas outlet and adapted to pass a stream of gas therethrough, a plurality of courses of troughs arranged in said chamber, the troughs of each course being sloped from the horizontal with each succeeding trough in the course being arranged in a direction of slope generally opposite to that of its preceding trough, at least two of said courses being arranged laterally adjacent to each other with individual troughs of said two courses alternating in the direction of their slope to form a criss-cross arrangement, means for feeding a material to the uppermost trough of said courses, and means for receiving and discharging said material from the downwardmost trough of the courses.

References Cited in the file of this patent

UNITED STATES PATENTS

| 12,922 | Mason | May 22, 1855 |
| 256,503 | Robinson | Apr. 18, 1882 |
| 531,459 | Crossley | Dec. 25, 1894 |
| 1,472,314 | Webster | Oct. 30, 1923 |
| 2,326,504 | Smith | Aug. 10, 1943 |
| 2,523,149 | Scheeline | Sept. 19, 1950 |
| 2,575,519 | Imhoff et al. | Nov. 20, 1951 |
| 2,590,148 | Berg | Mar. 25, 1952 |
| 2,634,842 | Caylor | Apr. 14, 1953 |
| 2,705,080 | Hicks | Mar. 29, 1955 |
| 2,712,361 | Lindsay | July 5, 1955 |
| 2,717,458 | Shabaker | Sept. 13, 1955 |
| 2,783,898 | Ardern et al. | Mar. 5, 1957 |